United States Patent
Santin et al.

(10) Patent No.: US 10,710,731 B2
(45) Date of Patent: Jul. 14, 2020

(54) TURBINE ENGINE HAVING A THREE-PHASE TRANSFORMER FOR POWERING ELECTRICAL DEICER ELEMENTS

(71) Applicants: SAFRAN AIRCRAFT ENGINES, Paris (FR); SAFRAN TRANSMISSION SYSTEMS, Colombes (FR); SAFRAN ELECTRICAL & POWER, Blagnac (FR)

(72) Inventors: Mathieu Jean Jacques Santin, Vincennes (FR); Guillaume Julien Beck, Chantilly (FR); Aldric Renaud Gabriel Marie Moreau De Lizoreux, Colombes (FR); Boris Pierre Marcel Morelli, Paris (FR); Jean-Michel Bernard Paul Chastagnier, Briis Sous Forges (FR); Thomas Turchi, Lieusaint (FR)

(73) Assignees: SAFRAN AIRCRAFT ENGINES, Paris (FR); SAFRAN TRANSMISSION SYSTEMS, Colombes (FR); SAFRAN ELECTRICAL & POWER, Blagnac (FR)

( * ) Notice: Subject to any disclaimer, the term of this patent is extended or adjusted under 35 U.S.C. 154(b) by 305 days.

(21) Appl. No.: 15/812,520

(22) Filed: Nov. 14, 2017

(65) Prior Publication Data
US 2018/0141666 A1 May 24, 2018

(30) Foreign Application Priority Data
Nov. 18, 2016 (FR) .................................. 16 61193

(51) Int. Cl.
*B64D 15/12* (2006.01)
*F01D 25/02* (2006.01)
(Continued)

(52) U.S. Cl.
CPC ............. *B64D 15/12* (2013.01); *F01D 15/10* (2013.01); *F01D 25/02* (2013.01); *F02C 7/047* (2013.01);
(Continued)

(58) Field of Classification Search
None
See application file for complete search history.

(56) References Cited

U.S. PATENT DOCUMENTS 3,535,618 A * 10/1970 Perrins .................... H01F 38/18
323/362
5,572,178 A 11/1996 Becker et al.
(Continued)

FOREIGN PATENT DOCUMENTS

EP 2390183 A1 11/2011
EP 2730506 A2 5/2014
(Continued)

OTHER PUBLICATIONS

Preliminary Search Report dated Jun. 29, 2017, in French priority application FR1661193 (2 pages).

*Primary Examiner* — Kayla Mccaffrey
(74) *Attorney, Agent, or Firm* — Bookoff McAndrews, PLLC

(57) ABSTRACT

In an aeroengine comprising a gas turbine engine driving a propeller via a reduction gearbox, the propeller comprising a plurality of blades, each provided with one or more electrical deicer elements and being set into rotation by a propeller-carrying shaft passing through the gearbox, the propeller-carrying shaft having a fastener flange for fasten-
(Continued)

ing to the propeller, provision is made, in order to deliver the electrical power needed for powering said electrical deicer elements, for the aeroengine to include a rotary three-phase transformer set into rotation by the propeller-carrying shaft and comprising firstly a rotor mounted inside the propeller-carrying shaft and angularly secured thereto, and secondly a stator secured to a stationary portion of the aeroengine, the rotary three-phase transformer being arranged behind the propeller fastener flange.

20 Claims, 4 Drawing Sheets

(51) Int. Cl.
  *F01D 15/10* (2006.01)
  *F02C 7/047* (2006.01)
  *F02C 7/36* (2006.01)
  *H01F 38/18* (2006.01)

(52) U.S. Cl.
  CPC ............... *F02C 7/36* (2013.01); *H01F 38/18* (2013.01); *F05D 2220/323* (2013.01); *F05D 2260/4031* (2013.01); *Y02T 50/671* (2013.01)

(56) References Cited

U.S. PATENT DOCUMENTS 6,769,874 B2 *  8/2004  Arel ........................ B64C 11/02
                                                416/60
9,638,044 B2 *  5/2017  Gieras ..................... B64D 15/12

FOREIGN PATENT DOCUMENTS

| | | |
|---|---|---|
| EP | 2868575 A1 | 5/2015 |
| EP | 2919555 A1 | 9/2015 |
| FR | 2213871 A1 | 8/1974 |
| WO | WO 2013/167827 A1 | 11/2013 |
| WO | WO 2013/167828 A1 | 11/2013 |
| WO | WO 2013/167829 A1 | 11/2013 |
| WO | WO 2013/167830 A1 | 11/2013 |

* cited by examiner

TURBINE ENGINE HAVING A THREE-PHASE TRANSFORMER FOR POWERING ELECTRICAL DEICER ELEMENTS

CROSS-REFERENCE TO RELATED APPLICATION(S)

This application claims the benefit of priority to French Patent Application No. 1661193, filed on Nov. 18, 2016, the entirety of which is incorporated by reference herein.

BACKGROUND OF THE INVENTION

On a conventional turboprop, the propeller is driven by a gas turbine (a free turbine or a linked turbine) via a gearbox, which gearbox is placed between the propeller and the engine and may be of various types: a train of simple gears, a train of compound gears, planetary, epicyclic, etc.

The propellers of such turboprops are provided with a deicing system serving to detach ice that accumulates on the blades, and for that purpose the system requires power of several kilowatts to be delivered by a three-phase alternating current (AC) network, since the low voltage direct current (DC) or single-phase AC power supplies of aircraft are specifically preferred for loads of smaller power. Most present-day deicing systems are electrical systems. Electric heater mats fastened to the pressure side and to the suction side of the propeller, in the vicinity of the leading edge, serve, when powered electrically, to create heat that enables ice that has been formed on the propeller to become detached, which ice is then ejected by centrifugal force.

For this purpose, it is necessary for the mats that are fastened on the blades of the propeller to be powered electrically via equipment that enables electrical power to be transferred from a stationary portion, i.e. the engine, to a rotary portion, i.e. the propeller.

Conventionally, such rotary transfer of electrical power is performed using a slip-ring and brush set, with transfer taking place by contact between firstly the slip-ring(s), mounted on the rear cover of the propeller and constituted by one or more tracks of conductive material, typically copper, and secondly brushes mounted on the engine gearbox and made of conductive material that rubs against the copper track(s). A variant of such an assembly is shown in patent EP 2 730 506 granted to the supplier Hamilton Sundstrand, with an assembly of pieces of equipment needed for rotary transfer (brushes and slip-ring) located at the rear of the gearbox and not between the gearbox and the propeller as is conventionally done.

Nevertheless, that solution presents numerous drawbacks associated essentially with the friction of the brushes against the slip-ring tracks, which is a major source of brush wear. That rapid wear therefore requires regular maintenance operations followed by replacement, which, if disregarded, can have the consequence of making the system unreliable.

Furthermore, the brushes are exposed to splashes of oil, particles of dust (including external particles such as sand, etc.), that can generate electric arcs at the points of contact, which might initiate combustion of inflammable elements constituting the rear panel of the propeller (which may contain magnesium), thereby starting a fire that could lead to the loss of the engine.

It is also known, from U.S. Pat. No. 5,572,178, to incorporate a single-phase rotary transformer on the drive shaft of an aircraft, in order to achieve rotary transfer without contact for the purpose of powering an electrothermal or electromechanical deicing system of medium power (in the range 300 watts (W) to 500 W per blade). Nevertheless, such a solution is not appropriate for purely electrical systems that require electrical power to be transferred at about 1 kilowatt (kW) per blade.

Specifically, under such circumstances, it is necessary to have recourse to a three-phase transformer, which amounts to arranging three single-phase rotary transformers side by side, giving rise to the following drawbacks:

the transformer as built up in this way presents considerable length, making it difficult to integrate on a turbine engine shaft without changing its dimensions, thereby having an overall impact on the length of the engine (implying an increase in weight and difficulties of integrating in the airplane);

the weight of such a transformer is necessarily high, and increases with increasing inside diameter; and when mounted at the end of a shaft, i.e. when "cantilevered out" on a shaft that may be subjected to considerable forces, it makes the dynamics of the shaft line more complex, since it is necessary to guarantee an airgap that is small, typically less than 1 millimeter (mm).

OBJECT AND SUMMARY OF THE INVENTION

An object of the invention is thus to propose integrating a three-phase rotary transformer in an aeroengine for the purpose of deicing the blades of the propeller, that enables a large amount of electrical power to be transferred without contact, while requiring few or no structural modifications.

This object is achieved by an aeroengine comprising a gas turbine engine driving a propeller via a reduction gearbox, the propeller comprising a plurality of blades, each provided with one or more electrical deicer elements and being set into rotation by a propeller-carrying shaft passing through said gearbox, the aeroengine being characterized in that in order to deliver the electrical power needed for powering said electrical deicer elements, it includes a rotary three-phase transformer set into rotation by said propeller-carrying shaft and comprising firstly a rotor mounted inside said propeller-carrying shaft and angularly secured thereto, and secondly a stator secured to a stationary portion of the aeroengine.

Thus, by integrating the transformer directly in the propeller shaft, structural modifications to the aeroengine are limited, as are the forces that the transformer needs to withstand.

Advantageously, said stationary portion of the aeroengine is an end portion of said gearbox remote from said propeller.

Preferably, said stator is carried by a support tube having the same axis as said propeller-carrying shaft, arranged inside it, and having a first end forming a flange that is fastened to said end portion of the gearbox. Said support tube and said flange may optionally be made up of two distinct elements that are securely fastened to each other.

The aeroengine may further include a bearing mounted between said support tube and said propeller-carrying shaft. Said bearing is advantageously arranged at a second end of said support tube remote from said first end.

Said rotary three-phase transformer may be a "U-type" radial flux transformer or an "E-type" axial flux transformer.

Preferably, said rotary three-phase transformer is located beside the propeller at the front of said propeller-carrying shaft.

A particular application of the invention lies with an airplane turboprop or turbofan, or with a helicopter turboshaft engine.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

The principle of the invention relies on a particular way of integrating a transformer in an aeroengine gearbox, which transformer may be a "U-type" radial flux rotary three-phase transformer (written UTF in this document below) or an "E-type" axial flux rotary three-phase transformer (written ETF in this document below), as described by way of example in applications WO 2013/167827, WO 2013/167828, WO 2013/167829, and WO 2013/167830, the contents of each of which is incorporated herein by reference, and is used for the purpose of transferring electrical power to an aeroengine propeller. For given electrical power, a transformer integrated in this way serves to save weight and size compared with a conventional three-phase transformer.

Figure 1:
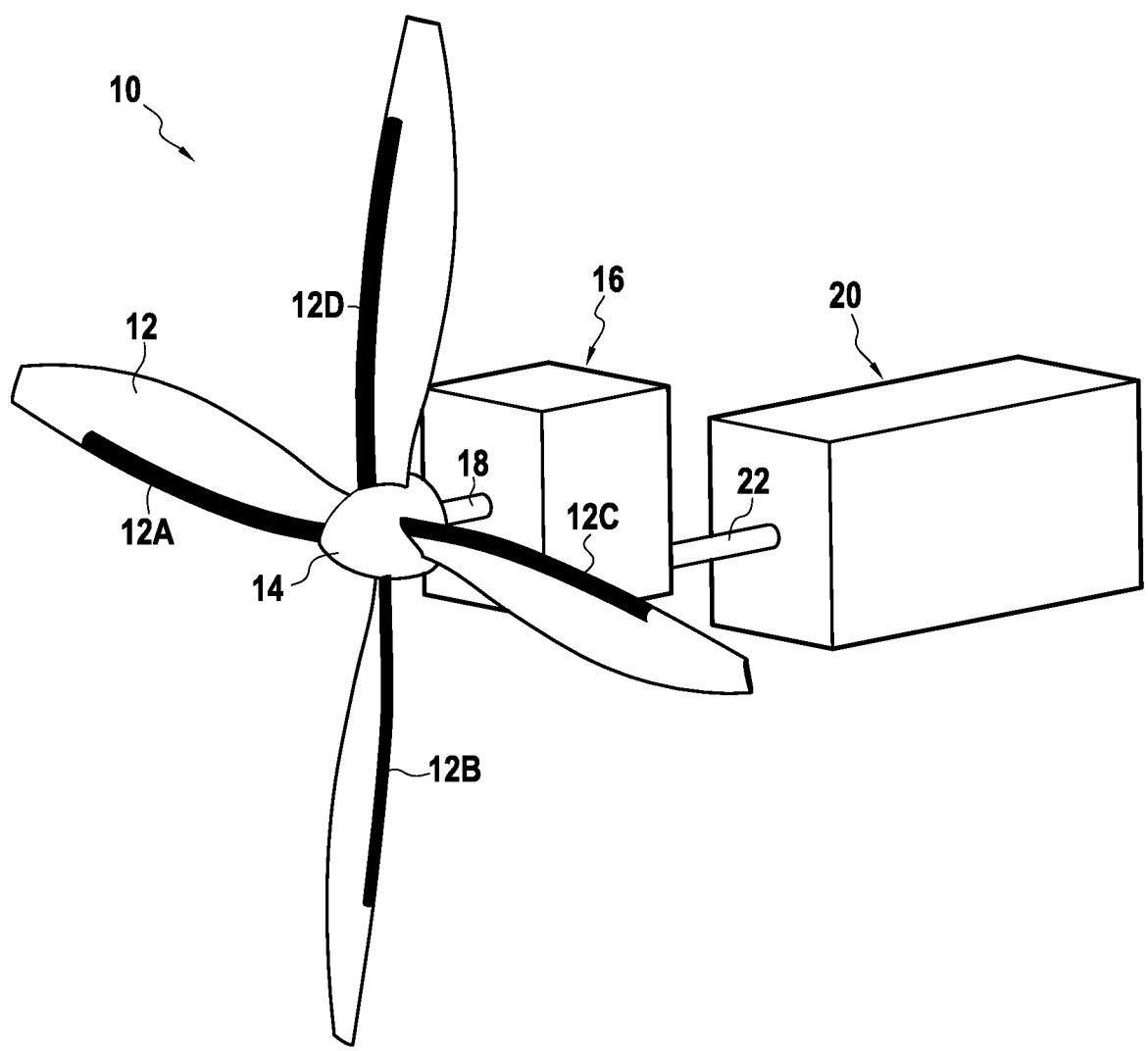
FIG. 1 is a diagrammatic perspective view of an aeroengine enabling the invention to be embodied.

As shown diagrammatically in FIG. 1, a propeller 10 comprising a plurality of blades 12 arranged around a hub 14 and each having one or more electrical deicer elements 12A to 12D is connected to a resuction gearbox 16 via a propeller-carrying shaft 18. In turn, the gearbox is connected to a gas turbine engine 20 of the aeroengine via a drive shaft 22. The gearbox converts speed between the propeller arranged at the front of the gearbox and rotating at one determined speed and the gas turbine engine mounted behind the gearbox and rotating at a much higher speed. The term "aeroengine" is used to cover equally well an aircraft turboprop, a helicopter turboshaft engine, or a turbofan, preferably having a high bypass ratio.

Figure 2:
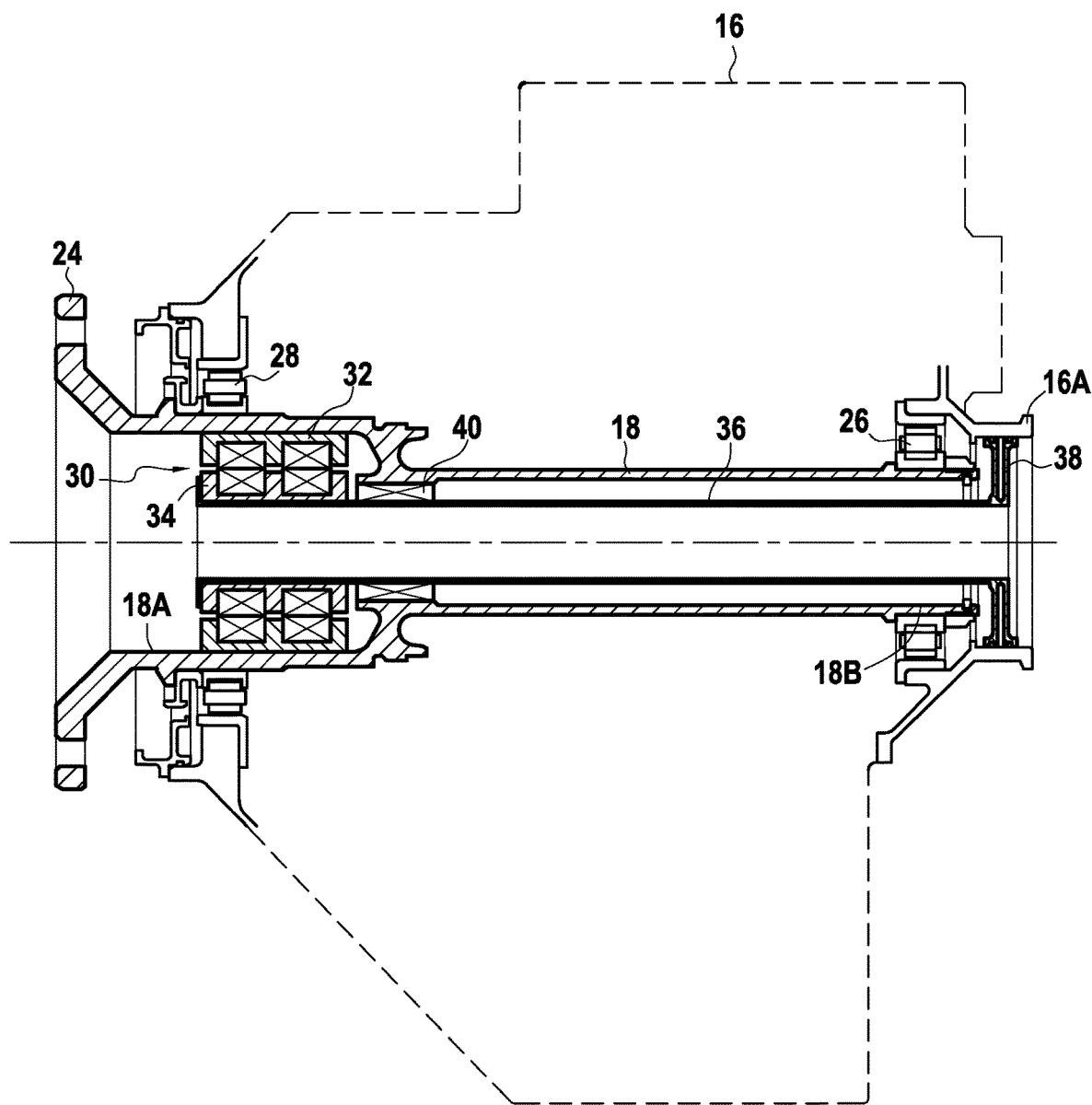
FIGS. 2 and 3 are highly diagrammatic views showing a radio flux rotary three-phase transformer integrated inside a propeller-carrying shaft of the FIG. 1 aeroengine.

FIG. 2 shows the propeller-carrying shaft 18 in greater detail (although the electric wiring is not shown in order to avoid overloading the figure) and it includes in particular a fastener flange 24 at its front end 18A for fastening to the propeller 10. The shaft is supported by a pair of bearings 26 and 28 in the gearbox 16 through which it passes. The propeller-carrying shaft presents a diameter in this front portion that is greater than the diameter of a rear portion 18B.

In accordance with the invention, it is proposed to deliver the electrical power needed for powering the electrical deicer elements by placing a radial flux three-phase rotary transformer (UTF 30) inside this propeller-carrying shaft passing through the gearbox, with an outer rotor 32 fastened to an inside wall of the propeller-carrying shaft 18 and placed around an inner stator 34 secured to a stationary portion of the aeroengine and constituted by an advantageously tubular shaft (or support tube 36) on the same axis as the propeller-carrying shaft and having its end remote from the fastener flange extending to the rear of the gearbox, through which it passes adjacent to the engine. In the diagrammatic example shown, this end of the support tube is formed by a flange 38 that forms an integral portion of the tube and that is securely fastened to the rear of the gearbox, but a connection to any other available stationary support of the aeroengine could naturally be envisaged.

Figure 3:
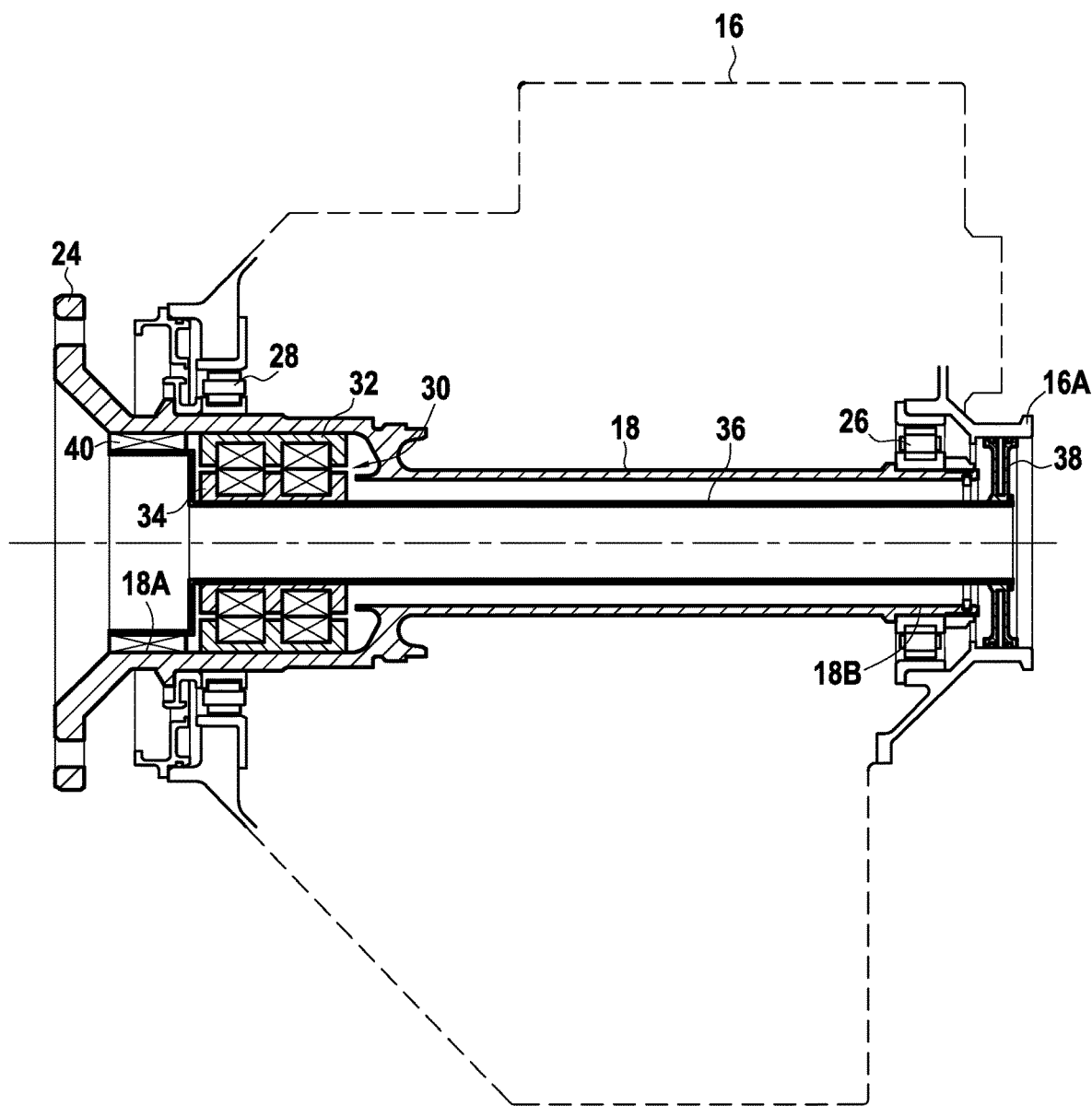

A bearing 40 is added between the stator support tube 36 and the propeller-carrying shaft 18 in order to improve centering of the three-phase rotary transformer 30 and limit variations of airgap. Various bearing technologies may be envisaged, such as smooth bearings, ball bearings, roller bearings, etc. Nevertheless, it should be observed that any need to add this bearing depends on the overall design, and if the mounting is sufficiently "rigid", it is possible to omit this bearing. In order to avoid the UFT 30 being cantilevered out on the support tube, the bearing may be added to the UFT on the right in the figure, beside the engine, or on the left, beside the propeller at the end of the support tube, as in the example of FIG. 3. In this configuration, the flange 38 and the support tube 36 then form two distinct elements that are securely fastened to each other by standard fastener means of screw, fluting, or similar type.

The advantages provided by this configuration for a UFT inside the propeller-carrying shaft 18 are numerous, and in particular:

use is made of empty space that would otherwise not be used inside the propeller-carrying shaft, given that the diameter of the shaft is determined by the forces exerted on the propeller, so this empty space is present regardless of the architecture of the gearbox;

the diameter of the UFT is reduced compared with an external arrangement, thereby enabling a saving to be obtained in its overall weight; and the performance of the UFT is increased by airgap variations being limited, since bending movements of the propeller-carrying shaft are limited as a result of there being no "cantilevered out" configuration, and adding the bearing 40 on the stator support tube also serves to limit bending movements of the support tube.

Figure 4:
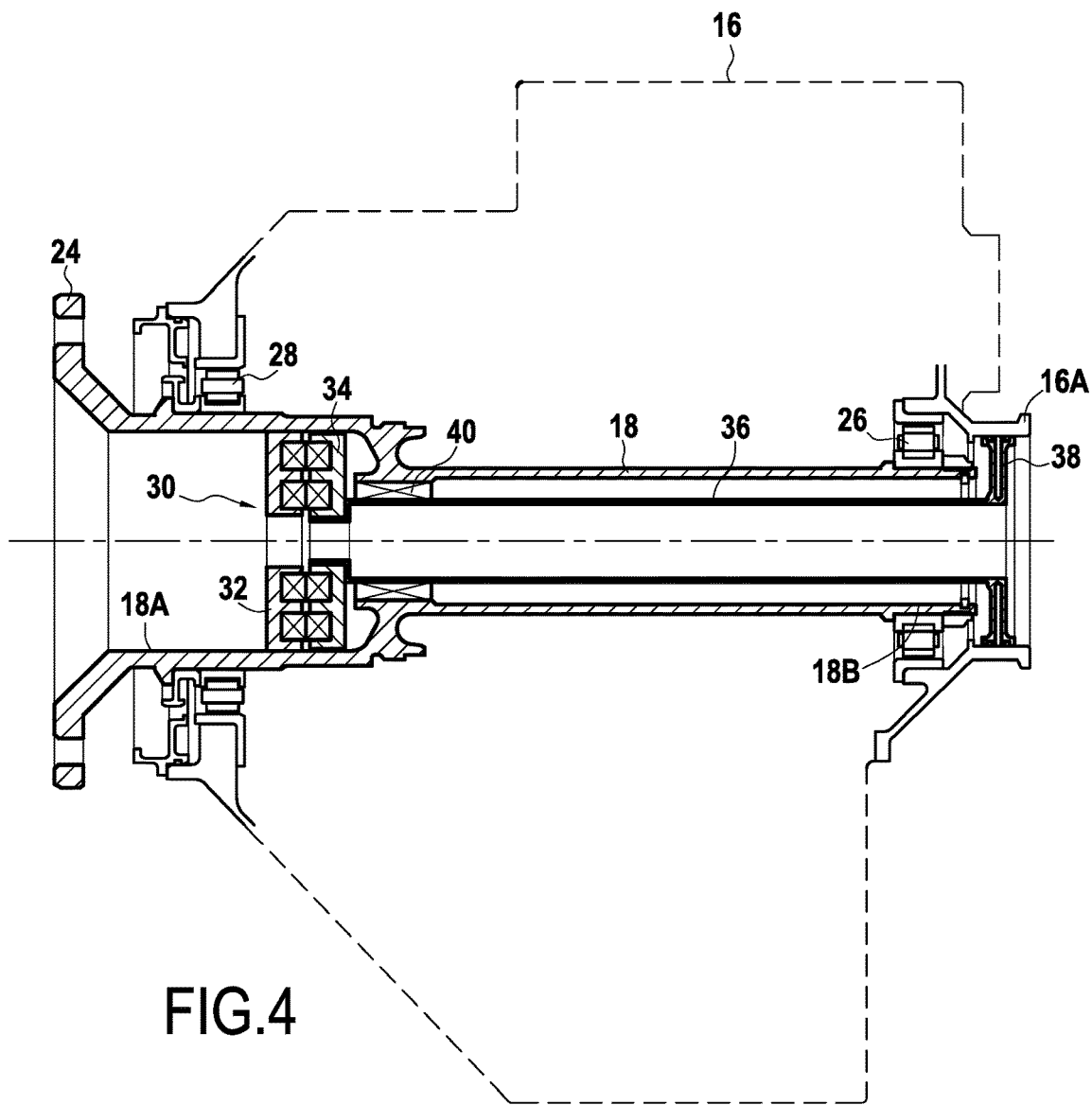
FIG. 4 and its detail FIG. 4A are highly diagrammatic views showing how an axial flux rotary three-phase transformer can be integrated inside a propeller-carrying shaft of the FIG. 1 aeroengine.
Figure 4A:
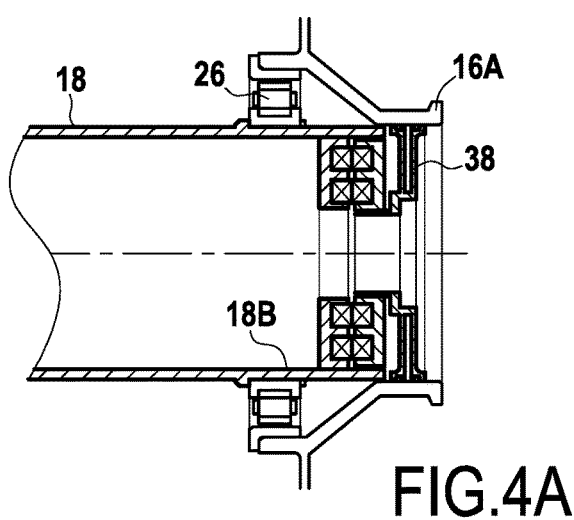

FIG. 4 shows in diagrammatic manner (the electric wiring likewise being omitted) how an axial flux rotary three-phase transformer EFT can be integrated inside the propeller-carrying shaft 18. The positioning of the EFT at the front of the propeller-carrying shaft (i.e. beside the propeller) is preferable since the empty volume is greater and is present on all configurations of a propeller gearbox. Nevertheless, positioning beside the engine could also be envisaged, providing the propeller-carrying shaft is modified at the rear of the gearbox, as shown in the detail of FIG. 4A. In this configuration, in order to integrate the EFT, it is necessary to increase the diameter of the propeller-carrying shaft 18 (in particular in its rear portion 18B which then comes into alignment with its front portion 18A) and consequently to increase the diameter of the bearing 26. In contrast, this configuration presents the advantage of not requiring a support tube 36 or a bearing 40.

As in the above example, the axial flux three-phase rotary transformer 30 is placed inside the propeller-carrying shaft 18, with its rotor 32 fastened to the inside wall of the propeller-carrying shaft, and a fixed portion 36 is added inside this propeller-carrying shaft to support the stator 34 so that the stator is stationary relative to the gearbox and to the rotor placed facing the stator 34. In the diagrammatic example shown, this end of the support tube is terminated by a flange 38 fastened to the rear of the gearbox, however a connection to any other available stationary support of the aeroengine could naturally be envisaged.

A bearing 40 may be mounted between the support tube 36 of the stator and the propeller-carrying shaft 18 in order to improve centering of the three-phase rotary transformer 30 and limit airgap variations.

This configuration for integration in the propeller-carrying shaft has the same advantages as above, and in particular:

it makes use of empty space that would otherwise not be used inside the propeller-carrying shaft;
the transformer presents a small diameter; and
performance of the transformer increased by limiting variations in airgap.

With the invention, it is proposed to integrate the transformer inside the propeller-carrying shaft in a manner that enables the size and the weight of the transformer to be optimized, regardless of whether it is of the "U-type" or of the "E-type".

The invention claimed is:

1. An aeroengine comprising a gas turbine engine driving a propeller via a reduction gearbox, the propeller comprising a plurality of blades, each provided with one or more electrical deicer elements and being set into rotation by a propeller-carrying shaft passing through said gearbox, the propeller-carrying shaft having a fastener flange for fastening to the propeller, wherein in order to deliver the electrical power needed for powering said electrical deicer elements, the aeroengine includes a rotary three-phase transformer set into rotation by said propeller-carrying shaft and comprising firstly a rotor mounted inside said propeller-carrying shaft and angularly secured thereto, and secondly a stator secured to a stationary portion of the aeroengine, the rotary three-phase transformer being arranged behind the propeller fastener flange, wherein said stationary portion of the aeroengine is an end portion of said gearbox remote from said propeller.

2. The aeroengine, according to claim 1, wherein said stator is carried by a support tube having the same axis as said propeller-carrying shaft, arranged inside it, and having a first end forming a flange that is fastened to said end portion of the gearbox.

3. The aeroengine, according to claim 2, wherein said support tube and said flange are formed of two distinct elements that are securely fastened to each other.

4. The aeroengine, according to claim 2, further including a bearing mounted between said support tube and said propeller-carrying shaft.

5. The aeroengine, according to claim 4, wherein said bearing is arranged at a second end of said support tube remote from said first end.

6. The aeroengine, according to claim 1, wherein in a front portion, said propeller-carrying shaft presents a diameter greater than the diameter of a rear portion of the propeller-carrying shaft, and said rotary three-phase transformer is arranged beside the propeller in said front portion of said propeller-carrying shaft.

7. The aeroengine, according to claim 1, wherein said rotary three-phase transformer is a "U-type" radial flux transformer.

8. The aeroengine, according to claim 1, wherein said rotary three-phase transformer is a "E-type" axial flux transformer.

9. The aeroengine, according to claim 1, wherein said rotary three-phase transformer is arranged at the end remote from the propeller in a rear portion of said propeller-carrying shaft.

10. The aeroengine, according to claim 1, wherein the aeroengine consists in an aircraft turboprop or turbofan, or a helicopter turboshaft engine.

11. An aeroengine comprising an engine driving a propeller via a reduction gearbox, the propeller comprising a plurality of blades, each provided with one or more electrical deicer elements and being set into rotation by a shaft passing through said gearbox, the shaft having a fastener flange for fastening to the propeller, wherein in order to deliver the electrical power needed for powering said electrical deicer elements, the aeroengine includes a rotary three-phase transformer set into rotation by said shaft and comprising firstly a rotor mounted inside said shaft and angularly secured thereto, and secondly a stator secured to a stationary portion of the aeroengine, the rotary three-phase transformer being arranged behind the propeller fastener flange, wherein said stationary portion of the aeroengine is an end portion of said gearbox remote from said propeller.

12. The aeroengine, according to claim 11, wherein said stator is carried by a support tube having the same axis as said shaft, arranged inside it, and having a first end forming a flange that is fastened to said end portion of the gearbox.

13. The aeroengine, according to claim 12, wherein said support tube and said flange are formed of two distinct elements that are securely fastened to each other.

14. The aeroengine, according to claim 12, further including a bearing mounted between said support tube and said shaft.

15. The aeroengine, according to claim 14, wherein said bearing is arranged at a second end of said support tube remote from said first end.

16. The aeroengine, according to claim 11, wherein in a front portion, said shaft presents a diameter greater than the diameter of a rear portion of the shaft, and said rotary three-phase transformer is arranged beside the propeller in said front portion of said shaft.

17. The aeroengine, according to claim 11, wherein said rotary three-phase transformer is a "U-type" radial flux transformer or is a "E-type" axial flux transformer.

18. The aeroengine, according to claim 11, wherein said rotary three-phase transformer is arranged at the end remote from the propeller in a rear portion of said shaft.

19. The aeroengine, according to claim 11, wherein the aeroengine consists in an aircraft turboprop or turbofan, or a helicopter turboshaft engine.

20. An aeroengine comprising a gas turbine engine driving a propeller via a reduction gearbox, the propeller comprising a plurality of blades, each provided with one or more electrical deicer elements and being set into rotation by a propeller-carrying shaft passing through said gearbox, the propeller-carrying shaft having a fastener flange for fastening to the propeller, wherein in order to deliver the electrical power needed for powering said electrical deicer elements, the aeroengine includes a rotary three-phase transformer set into rotation by said propeller-carrying shaft and comprising firstly a rotor mounted inside said propeller-carrying shaft and angularly secured thereto, and secondly a stator secured to a stationary portion of the aeroengine, the rotary three-phase transformer being arranged behind the propeller fastener flange, wherein said rotary three-phase transformer is a "E-type" axial flux transformer.

* * * * *